United States Patent [19]

Cooper et al.

[11] 4,238,039

[45] Dec. 9, 1980

[54] RAILWAY CAR COUPLER WEAR LINER

[75] Inventors: Jerry W. Cooper, Waynesville; Homer N. Holden, Sylvia; Richard D. Medford, Waynesville, all of N.C.; John S. Haley, Centerville, Ohio

[73] Assignee: Dayco Corporation, Dayton, Ohio

[21] Appl. No.: 27,340

[22] Filed: Apr. 5, 1979

[51] Int. Cl.³ .............. B61G 7/10; B61G 9/20; F16C 27/02; F16C 33/20
[52] U.S. Cl. ...................... 213/61; 105/225; 213/21; 213/60; 308/3 R; 308/238
[58] Field of Search ............ 213/63, 21, 60, 61; 105/225, 199 C; 308/3 R, 238

[56] References Cited

U.S. PATENT DOCUMENTS

| | | | |
|---|---|---|---|
| 3,554,618 | 1/1971 | Ditzler et al. | 308/3 R |
| 3,950,599 | 4/1976 | Board, Jr. | 308/238 X |
| 4,055,254 | 10/1977 | Chierici et al. | 213/61 |
| 4,133,434 | 1/1979 | Chierici | 213/61 |
| 4,188,888 | 2/1980 | Cooper et al. | 105/199 C |

Primary Examiner—Howard Beltran
Attorney, Agent, or Firm—Reuben Wolk; Charles E. Bricker

[57] ABSTRACT

A wear member is provided for use between a pair of relatively movable components of a railway vehicle. The wear member is mounted on a support having a continuous supporting surface, with polymeric material having an antifriction wear surface to support the same against the continuous supporting surface while providing integral reinforcement for the polymeric material.

15 Claims, 8 Drawing Figures

RAILWAY CAR COUPLER WEAR LINER

BACKGROUND OF THE INVENTION

1. Field of the Invention

This invention relates to railway vehicle structure and in particular to a wear member for use between a pair of relatively movable components of such structure.

2. Prior Art Statement

It is known in the art to provide a wear member supported by at least one of a pair of relatively movable components of a railway vehicle for the purpose of protecting the components from wear. However, heretofore it has been common practice to provide a wear member made either entirely of a hard metal or entirely of a hard polymeric material and such wear member is suitably supported in position between such components and once the wear member becomes excessively worn it is removed and a new one installed in its position. However, metal wear members are usually made of comparatively expensive metallic materials and do not have optimum antifriction properties while wear members made entirely of polymeric material have comparatively poor structural strength and thus are often easily broken requiring frequent replacement.

It has been proposed heretofore to provide so-called wear members or liners for center plate structure of a railway vehicle with reinforcing material embedded therein as disclosed in U.S. patent application Ser. No. 841,175 filed Oct. 11, 1977, now U.S. Pat. No. 4,188,888, issued Feb. 19, 1980; however, such liners have minimum structural strength and in use are confined between associated supporting surfaces.

It has also been proposed in U.S. Pat. No. 3,554,618 to provide a wear member in the form of a pedestal liner which has an insert and plastic wear plate which is unsupported except at its peripheral edges.

SUMMARY

It is a feature of this invention to provide in a railway vehicle having a pair of relatively movable components and a wear member supported by one of the components and protecting the components from wear during relative movement thereof the improvement wherein the wear member has a structural strength which makes such wear member substantially structurally self supporting and comprises a support having a continuous planar supporting surface, a polymeric material defining an antifriction wear surface engageable by the other component, and means attaching the polymeric material to the support and supporting same against the continuous supporting surface.

Another feature of this invention is to provide a wear member of the character mentioned which also has integral reinforcement for the polymeric material thereof.

Another feature of this invention is to provide a coupler carrier wear member of the character mentioned.

Another feature of this invention is to provide a wear member of the character mentioned in which the polymeric material is ultra high molecular weight polyethylene.

Another feature of this invention is to provide a wear member of the character mentioned in which the support is made of metal and the attaching means comprises a perforated metal structure fixed to the support with the polymeric material surrounding the metal structure and serving as a matrix therefor with the antifriction wear surface being defined as an outside surface of the polymeric material.

Another feature of this invention is to provide a wear member of the character mentioned in which the support has a planar central portion which defines the continuous supporting surface thereof and a pair of depending legs extending from opposite side edges of the central portion.

Another feature of this invention is to provide a wear member of the character mentioned in which the perforated metal structure may be either a single sheet or a plurality of sheets of expanded metal structure.

Another feature of this invention is to provide an improved method of making a wear member of the character mentioned for use between relatively movable components of a railway vehicle.

Therefore, it is an object of this invention to provide an improved wear member and method of making same having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
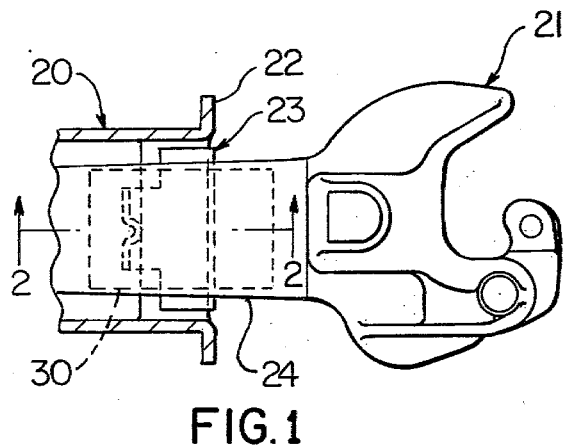
FIG. 1 is a fragmentary top plan view of an end portion of a freight car showing a coupler and a coupler carrier thereof.
Figure 2:
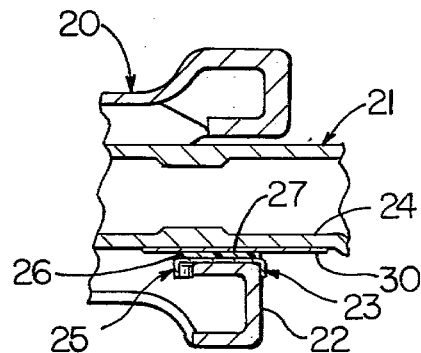
FIG. 2 is a fragmentary cross-sectional view taken essentially on the line 2—2 of FIG. 1.

Reference is now made to FIGS. 1 and 2 of the drawings which illustrate a fragmentary portion of an end portion of a railway vehicle which is designated generally by the reference numeral 20 and such railway vehicle has a coupler assembly 21 and a coupler carrier 22. As is known in the art the coupler assembly 21 and coupler carrier 22 are relatively movable and thus define what may be considered relatively movable members or components. A wear member designated generally by the reference numeral 23 is provided and supported by one of the components and in this example the wear member 23 is supported by the coupler carrier 22. The wear member 23 protects the components 21 and 22 and in particular the shank portion 24 of the coupler assembly 21 and the coupler carrier 22 from wear during relative movement thereof.

The wear member 23 comprises a support which is designated generally by the reference numeral 25, and a polymeric material 26 defining an antifriction wear surface 27 engageable by the coupler assembly 21 and in particular engageable by a plate member 30 (FIG. 2) fixed to the shank portion 24 of the coupler assembly 21. The wear member 23 also comprises means designated generally by the reference numeral 31 in FIG. 4 attaching the polymeric material 26 to the support 25.

Figure 4:
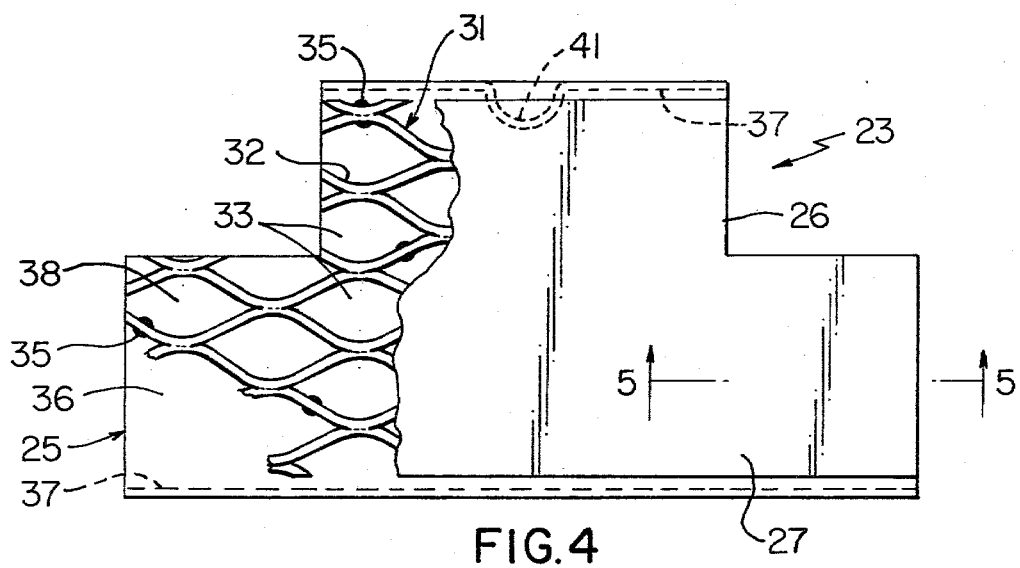
FIG. 4 is a plan view of the wear member of FIG. 3 with parts broken away particularly illustrating details of its construction.
Figure 5:
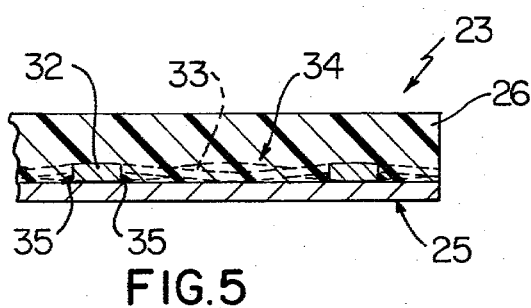
FIG. 5 is a cross-sectional view taken essentially on line 5—5 of FIG. 4.

As best seen in FIGS. 4-5, the attaching means 31 comprises a metal structure 32 fixed to the support 25 and having openings therein with a representative few of such openings being designated by the same reference numeral 33. The polymeric material 26 surrounds the metal structure 32 and serves as a matrix therefor while extending through the openings as seen at 34 in FIG. 5; and, it will be seen that the antifriction wear surface is defined as a top or outermost surface 27 of the polymeric material 26.

The metal structure 32 in this example of the invention is a grid-like structure in the form of an expanded metal structure. The expanded metal 32 may be the so-called standard variety wherein the sheet material is suitably slit and stretched or of the flat variety wherein after slitting and stretching the resulting metal structure is further flattened in a press, or the like.

The metal structure 32 is fixed to the support 25 by any suitable means knwon in the art and in this example of the invention mechanical means is preferably employed and such mechanical means is in the form of a weld means defined as spaced spot welds 35. Thus, the attaching means 31, in essence, comprises the metal structure 32 fixed by spot welds 35 to the support 25. The polymeric material 26 is then suitably disposed so that it flows around the metal structure filling the openings or voids 33 therein and thereby encapsulating or serving as a matrix therefor. Thus, with the metal structure 32 fixed to the support 25 the provision of the polymeric material 26 as a matrix as described herein results in such polymeric material being firmly attached to the metal structure 23 and hence firmly attached to the support 25 whereby the entire wear member with its support 25, metal structure 32 and polymeric material 26 is defined as a unitary structure.

Figure 3:
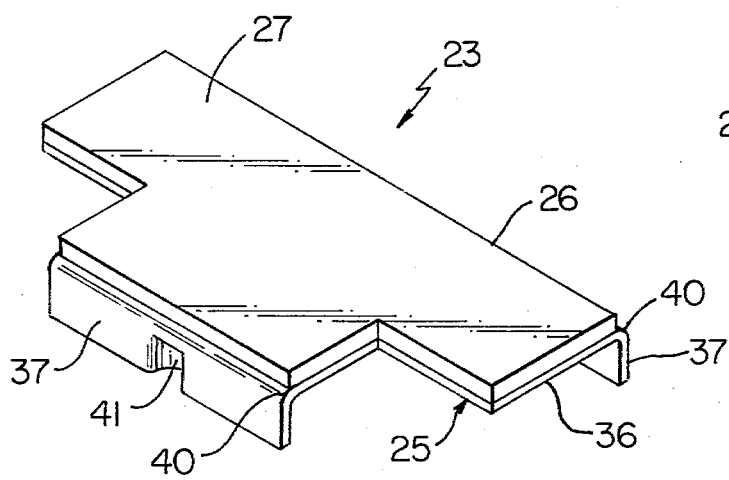
FIG. 3 is a perspective view of one exemplary embodiment of a coupler carrier wear member of this invention.

The polymeric material 26 may be suitably formed in position employing any technique known in the art and such polymeric material may be provided in either powder, flake, pellet, or similar form and supported in position by a suitable die structure (which is capable of being heated) around and against the support 25. The entire assembly including the die structure may then be supported on a stationary platen of a press, for example. A ram member of the press may then be employed for applying pressure to the polymeric material through the die structure while subjecting the die structure to a controlled temperature condition to thereby define the polymeric layer 26 which upon cooling thereof is in the completed form illustrated in FIG. 3. It will also be appreciated that the polymeric material 26 may be provided in an essentially molten form and cooled and solidified in position as a matrix material.

The polymeric material 26 may be of any suitable type known in the art; however, preferably such polymeric material is an ultra high molecular weight synthetic plastic material having molecular weight of at least two million. Satisfactory results have been obtained using ultra high molecular weight polyethylene which has a molecular weight within the range of four to six million.

The wear member 23 comprises a support 25, as previously mentioned, and it is seen that the support has a substantially flat main portion 36 which defines a continuous planar supporting surface 38 (FIG. 4) of the wear member 23 and a pair of depending legs 37 extending in the same direction from opposite side edges of the main portion 36. The legs 37 extend in substantially parallel relation and are defined as an integral part of the main portion 36 as a single-piece structure. Each leg 37 is connected to the main portion 36 by an arcuate transition portion 40 of generous radius and each transition portion 40 assures minimum stress concentration at the area of junction of its leg to the main portion 36. In this example of the wear member 23 one of the legs is of comparatively shorter length and this is merely due to the configuration of that portion of the coupler carrier 22 which supports the wear member 23.

The wear member 23 also has positioning means or locating means which assures precise location thereof on the coupler carrier. In this example such positioning means comprises a projection 41 (FIGS. 3 and 4) of semicircular form which extends from the shorter one of the two parallel legs 37 and is adapted to be received in a cooperating recess in the coupler carrier.

Figure 8:
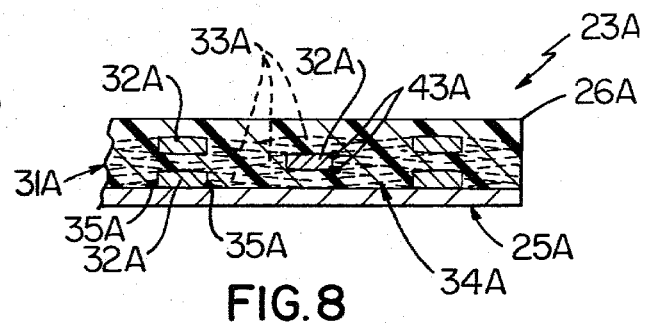
FIG. 8 is a cross-sectional view taken essentially on the line 8—8 of FIG. 7.
Figure 6:
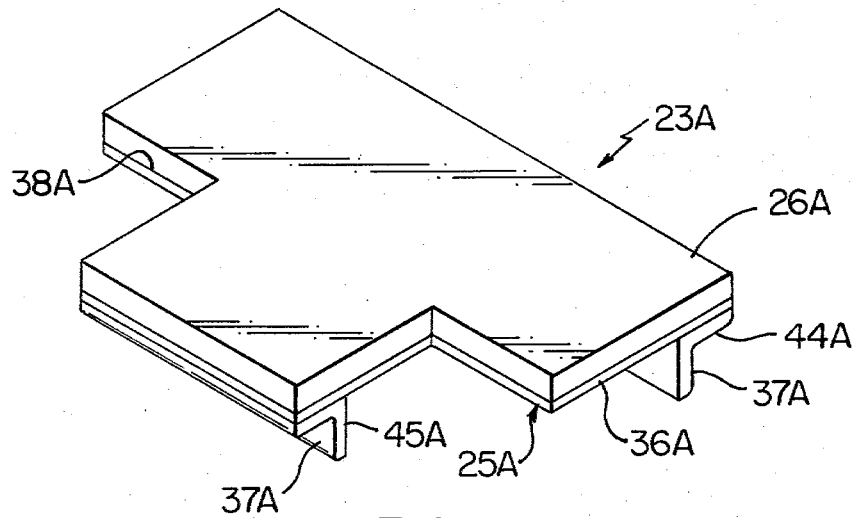
FIG. 6 is a perspective view similar to FIG. 3 illustrating another exemplary embodiment of the coupler carrier wear member of this invention.
Figure 7:
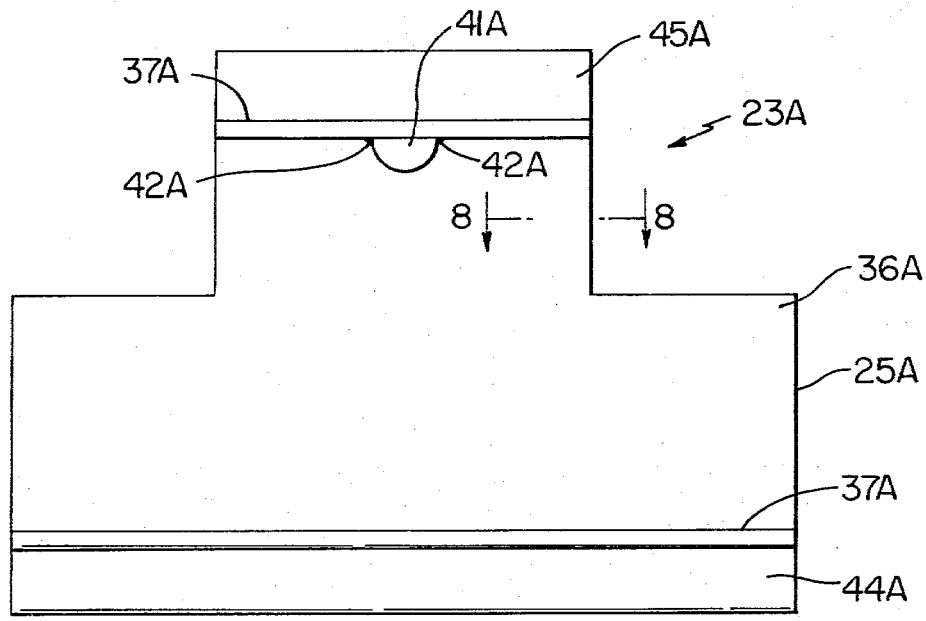
FIG. 7 is a view looking perpendicularly toward the bottom surface of the wear member of FIG. 6.

Another exemplary embodiment of a wear member of this invention is illustrated in FIGS. 6-8 of the drawings. The wear member of FIGS. 6-8 is very similar to the wear member 23; therefore, such wear member will be designated by the reference numeral 23A and representative parts of such wear member which are similar to corresponding parts of the wear member 23 will be designated in the drawings by the same reference numerals as in the wear member 23 (whether or not such representative parts are mentioned in the specification) followed by the letter designation A. Only those component parts of the wear member 23A which are different from parts of the wear member 23 will be designated by a new reference numeral and also followed by the letter designation A.

The wear member 23A also comprises a support 25A, a polymeric material 26A, and attaching means 31A (FIG. 8) for attaching the polymeric material 26A to the support 25A. The main differences between the wear member 23A and the wear member 23 are in the attaching means 31A and in the support 25A as will now be described.

The attaching means 31A of the wear member 23A comprises metal structure fixed to the support and having openings 33A therein with the polymeric material 26A surrounding the metal structure and serving as a matrix therefor while extending through the openings 33A in a similar manner as previously described. However, the metal structure comprises a plurality of sheets, shown as a plurality of three sheets, each designated by the same reference numeral 32A of grid-like expanded metal.

The sheets of expanded metal 32A are disposed in substantially parallel relation as seen in FIG. 8 and the inner one of the sheets 32A is fixed to the support 25A by suitable mechanical means shown in this example as a plurality of spot welds 35A. The outer two of the parallel sheets 32A may also be spot welded to each other with the inner one of such two outer sheets being spot welded to the inner sheet 32A, if desired, as shown typically by a pair of spot welds 43A. However, it will be appreciated that with the inner expanded metal sheet 32A fixed to the support 25A and the polymeric material 26A disposed as a matrix around such inner sheet as well as the adjoining two outer sheets 32A the polymeric material itself may serve as integral attaching means for attaching the two outer parallel sheets 32A to the inner sheet 32A and hence to the support 25A.

The polymeric material 26A flows through the entire metal structure, comprised of the three sheets 32A, and is disposed against the continuous supporting surface 38A of the flat main portion 36A of the support 25A. The technique in which the polymeric material 26A is provided through the three sheets 32A of expanded metal may be essentially similar to the technique described for the single sheet 32 of the wear member 23.

The wear member 23A also differs from the wear member 23 in that the legs 37A provided thereon are provided as separate members which are fixed to the flat main portion 36A of the support 25A. As best seen in FIG. 6 of the drawings each leg is of substantially L-shaped configuration having a pair of component portions or arms 44A and 45A. One of the arms 44A is suitably fixed to the main portion 36A and the other arm extends perpendicularly therefrom. Each arm 44A may be fixed to its support structure 25A by any suitable mechanical means including threaded bolts, weld means, and the like.

The wear member 23A also has positioning means or locating means 41A to facilitate precise installation thereof on an associated coupler carrier. The positioning means 41A in this example is a lug member of semicircular cross section which is welded to the shorter leg member 37A by welds 42A.

Each support 25 and 25A with its leg portions 37 and 37A respectively may be made of any suitable metallic material and in one application of the invention a ferrous metal was satisfactorily employed. Similarly, the expanded metal structure 31 and 31A is also preferably made of ferrous metal.

Each support 25 and 25A has a flat main portion 36 and 36A respectively and each main portion 36 and 36A has a continuous supporting surface 38 and 38A respectively, as previously mentioned. Each attaching means 31 and 31A serves the multiple purpose of attaching its associated polymeric material to its support while supporting same against its continuous supporting surface 38 or 38A as well as providing integral reinforcement for the associated polymeric material.

The member 23 has a single layer or thickness metal structure defined as an integral part thereof while the member 23A has a multiple or a triple thickness metal structure also defined as an integral part thereof. However, it will be appreciated that either member 23 or 23A may have an integral metal structure defined as a single thickness or as a plurality of thicknesses, as desired.

Each metal structure 32 and 32A is shown as a gridlike expanded metal structure having openings therein. However, the metal structure may be in the form of a wire mesh, plate structure having suitable openings or apertures therein, corrugated structure with suitable openings, or any other structure capable of being fixed to a main portion of a support and then having polymeric material disposed therearound so as to define a matrix for the metal structure whereby the embedment of metal structure within the polymeric matrix material results in polymeric material being attached to the support.

The polymeric material 26 and 26A has been described herein as being polymeric material of an ultra high molecular weight greater than two million and preferably in the range of four to six million. The preferred technique for determining this molecular weight is referred to as the intrinsic viscosity test and is widely used in the United States.

Reference has been made in this disclosure of the invention to the forming of polymeric material which may be provided in powder, flake, or pellet form and which is heated under controlled temperatures and pressures in associated structure. In the case of ultra high molecular weight polyethylene used to define wear members 23 and 23A and having a molecular weight in the range of four to six million such material may be formed or molded at temperatures ranging between 250° and 450° F. and at pressures ranging between 500 and 2,000 psi and with the molding action being achieved within time periods of three minutes to thirty minutes.

While present exemplary embodiments of this invention, and methods of practicing the same, have been illustrated and described, it will be recognized that this invention may be otherwise variously embodied and practiced within the scope of the following claims.

What is claimed is:

1. In a wear member for a railway vehicle wherein said vehicle comprises a pair of relatively movable components and said wear member is supported by one of said components and protects said components from wear during relative movement thereof; the improvement wherein said wear member comprises; a support having a continuous supporting surface; a polymeric material having an anti-friction wear surface engageable by said other component; means attaching said polymeric material to said support; said attaching means comprising a metal structure having openings therein and mechanical means fixing said metal structure to said support; said polymeric material surrounding said metal structure and serving as a matrix therefor while extending through said openings with said antifriction wear surface defining the outermost surface of said polymeric material; said attaching means serving the multiple purpose of attaching said polymeric material to said support, supporting said polymeric material against said continuous supporting surface, and providing integral reinforcement for said polymeric material; and said support, metal structure, and polymeric material being defined as a unitary structure.

2. A wear member as set forth in claim 1 in which said support comprises a metal support and said mechanical means comprises mechanical weld means fixing said metal structure to said support.

3. A wear member as set forth in claim 1 in which said support comprises a metal support plate.

4. A wear member as set forth in claim 1 in which said polymeric material comprises an ultra high molecular weight polyethylene.

5. A wear member as set forth in claim 4 in which said polyethylene has a molecular weight of at least two million.

6. A wear member as set forth in claim 4 in which said polyethylene has a molecular weight within the range of four to six million.

7. A wear member as set forth in claim 1 in which said metal structure comprises expanded metal structure.

8. A wear member as set forth in claim 7 in which said metal structure comprises a single sheet of a grid-like expanded metal structure.

9. A wear member as set forth in claim 7 in which said metal structure comprises a plurality of sheets of grid-like expanded metal disposed in substantially parallel relation with an inner one of said sheets being fixed to said support.

10. In a coupler carrier wear member for a railway vehicle wherein said vehicle comprises a coupler assembly and a coupler carrier which are relatively movable and said coupler carrier wear member is supported by said coupler carrier and protects said coupler assembly and coupler carrier from wear during relative movement thereof; the improvement wherein said wear member comprises; a support having a continuous supporting surface; a polymeric material defining an antifriction wear surface engageable by said coupler assembly; means attaching said polymeric material to said support; said support comprising a metal support; said attaching means comprising a metal structure having openings therein and mechanical means fixing said metal structure to said support; said polymeric material surrounding said metal structure and serving as a matrix therefor while extending through said openings with said antifriction wear surface defining the outermost surface of said polymeric material; said attaching means serving the multiple purpose of attaching said polymeric material to said support, supporting said polymeric material against said continuous supporting surface, and providing integral reinforcement for said polymeric material; and said support, metal structure, and polymeric material being defined as a unitary structure.

11. A wear member as set forth in claim 10 in which said polymeric material comprises an ultra high molecular weight polyethylene.

12. A wear member as set forth in claim 10 in which said support has a substantially planar main portion and a pair of depending legs extending in the same direction from opposite ends thereof, said legs being adapted to be supported against cooperating parts of said coupler carrier, and said metal structure comprises a substantially planar structure disposed within the outline of said main portion.

13. A wear member as set forth in claim 12 in which said depending legs are defined as an integral part of said main portion as a single-piece structure.

14. A wear member as set forth in claim 12 in which said depending legs comprise separate members fixed to said main portion.

15. A wear member as set forth in claim 14 in which said separate members are L-shaped members consisting of a pair of arms disposed in perpendicular relation, one of said arms of each member being fixed to said main portion and the other of said arms of each member defining one of said pair of depending legs.

* * * * *